United States Patent [19]

Hongu et al.

[11] Patent Number: 4,631,589
[45] Date of Patent: Dec. 23, 1986

[54] DARK LEVEL RESTORING CIRCUIT

[75] Inventors: Masayuki Hongu, Kanagawa; Takahiko Tamura, Tokyo; Masaharu Tokuhara, Kanagawa, all of Japan

[73] Assignee: Sony Corporation, Tokyo, Japan

[21] Appl. No.: 642,334

[22] Filed: Aug. 20, 1984

[30] Foreign Application Priority Data

Aug. 22, 1983 [JP] Japan .................................. 58-152926

[51] Int. Cl.[4] .............................................. H04N 5/16
[52] U.S. Cl. .................................................. 358/171
[58] Field of Search ............... 358/171, 170, 211, 221, 358/174

[56] References Cited

U.S. PATENT DOCUMENTS

| 3,970,777 | 7/1976 | Bradford | 358/170 |
| 4,124,869 | 11/1978 | Heitmann | 358/171 |
| 4,369,466 | 1/1983 | Matsuzaki | 358/171 |

Primary Examiner—Tommy P. Chin
Attorney, Agent, or Firm—Hill, Van Santen, Steadman & Simpson

[57] ABSTRACT

A dark signal component below a predetermined level of a video signal is varied such that a dark peak level is made to coincide with a pedestal level by feedback control. According to this configuration, a signal component toward a white level side above the predetermined level is not changed by dark restoration, thus obtaining stable color reproduction and stable brightness which are not affected by the dark restoring operation.

7 Claims, 16 Drawing Figures (A)　　　　　(B)

(A) t1　　　(B) t2　　　(C) t3

(A)  (B)  (C)

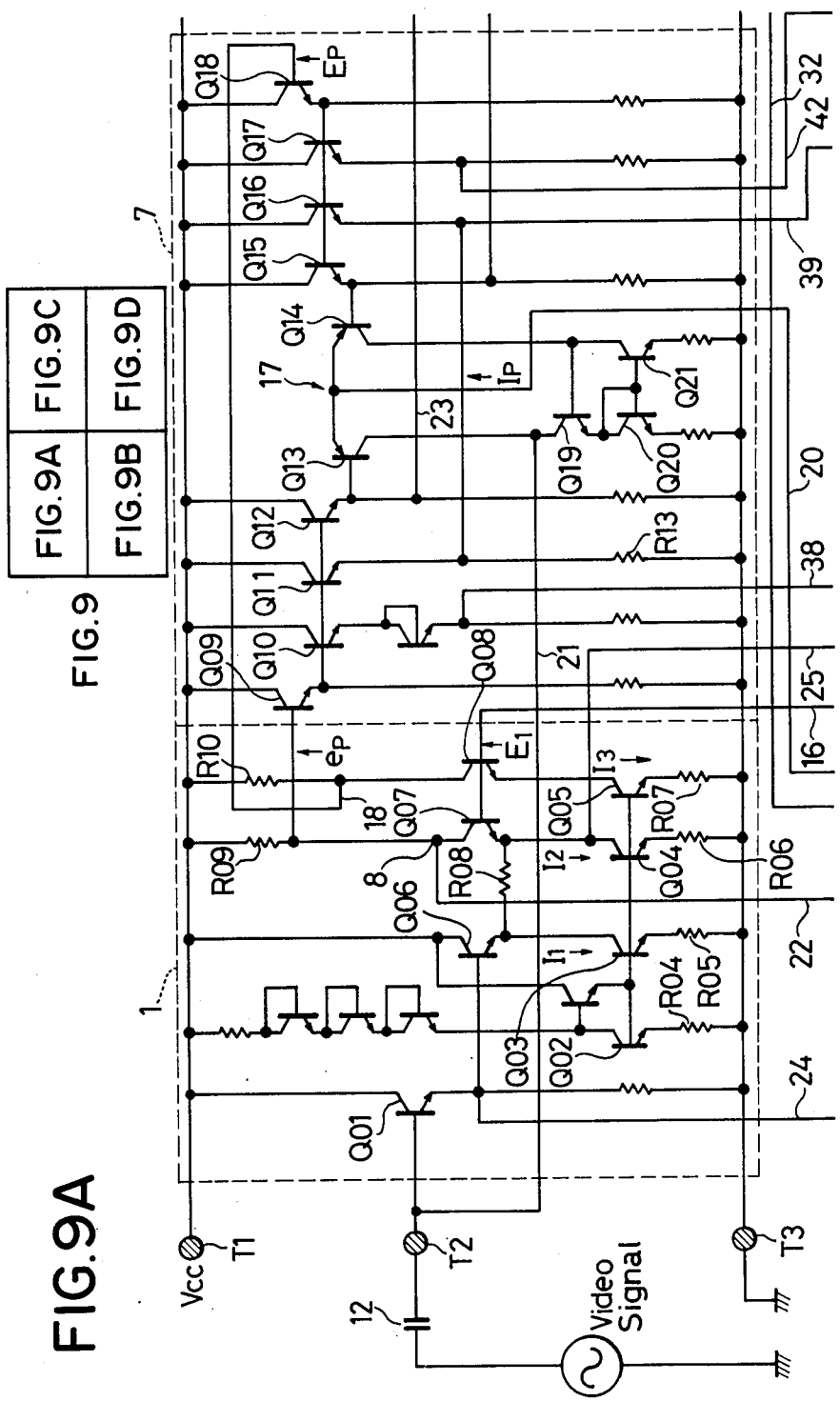

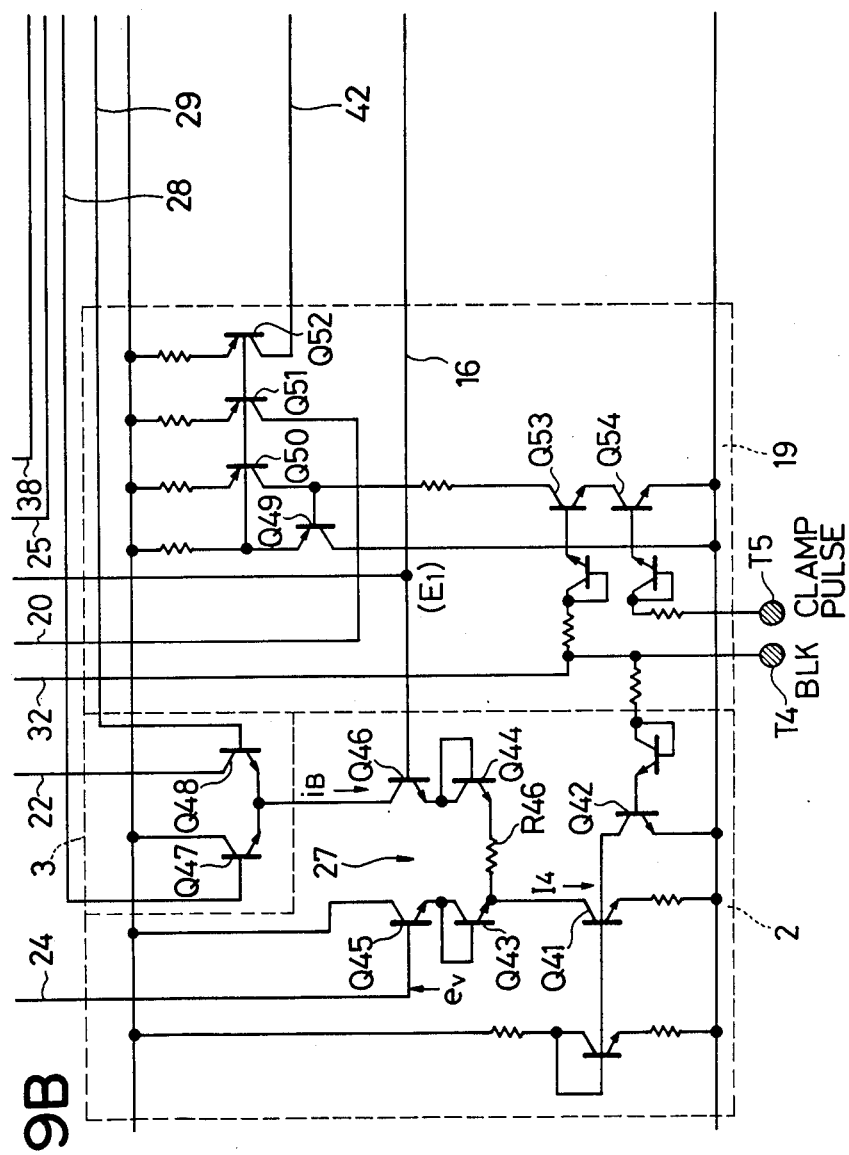

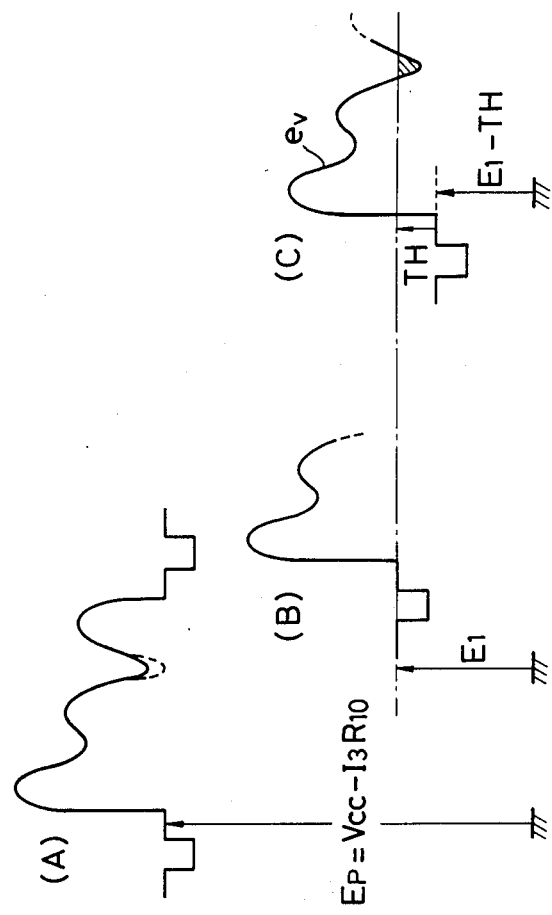

DARK LEVEL RESTORING CIRCUIT

BACKGROUND OF THE INVENTION

The present invention relates to a dark level restoring circuit for recovering a dark level in a television receiver.

A video signal is generally transmitted in a state where a pedestal level used as a reference level for the darkest level is shifted toward a white level side. A difference between the pedestal level and a dark level is called a set-up level. The set-up level is not always equal and depends on the type of broadcasting station, TV camera, home video tape recorder (VTR), and the like. For this reason, the dark level must be precisely recovered in a television (TV) receiver (i.e., the dark level of the video signal must coincide with a cut-off level of a cathode-ray tube (CRT)) used in the receiver.

A method for decreasing a DC transmission factor and a method for decreasing a luminance level by an amount corresponding to the set-up level are conveniently used as a dark level restoring method. In the former method, since the set-up level (DC component) is decreased, no dark image is omitted. However, in a video signal having a low set-up level, the luminance level is shifted toward the dark level, so that a resolution of the dark image is deteriorated. In combination with this former method, a luminance ABL (automatic beam limiter) is usually used for controlling a beam intensity of the CRT by decreasing the luminance level for an image which requires too high a beam current. In this combination, however, deterioration of dark resolution undesirably occurs and precise dark restoration cannot be expected.

On the other hand, in the latter method, a dark peak level during one vertical scanning period in a video signal, for example, as shown in FIG. 1A, is detected and is controlled to coincide with the darkest level (pedestal level), as shown in FIG. 1B. This method is called a "dynamic picture system". A contrast ABL (or picture ABL) for controlling a beam intensity by decreasing a contrast of an image which requires a high beam current level of a CRT can be used in combination with this method, so that a stable dark level restoration is expected.

However, in this latter method, a luminance signal level always fluctuates due to a luminance level control corresponding to the dark peak level of the video signal. Therefore, a level ratio Y/C of a luminance signal Y to a chroma signal C is undesirably changed. For this reason, the density of a color is changed corresponding to the dark peak level control. For example, in a flesh tone of a human body (a luminance level of 50 to 80% with respect to a white peak level), when the dark peak level is shifted toward the white peak level, the luminance signal is decreased by the control loop. As a result, the chroma signal C changes to an undesirably high level with respect to the luminance signal Y, and flesh tones become too dense. Alternatively, when the dark peak level is low, the flesh tones become too light.

Furthermore, it is assumed that dark restoration is performed at time $t_1$ by the control loop, as shown in FIG. 2A, and a signal P at the dark level side (e.g., a dark framed telop signal) is inserted at time $t_2$, as shown in FIG. 2B. In this case, dark restoration is performed such that the dark peak level of the signal P coincides with the pedestal level by the control loop. For this reason, the brightness of an image is abruptly increased as shown in FIG. 2B. However, as shown in FIG. 2C, when the signal P has abruptly disappeared at time $t_3$, the luminance level of the image is abruptly decreased in correspondence thereto. Therefore, the image becomes unsatisfactory and uncomfortable to watch.

SUMMARY OF THE INVENTION

It is an object of the present invention to provide a dark level restoring circuit in which the above drawbacks are resolved.

In the dark level restoring circuit of the present invention, an amplitude of a dark signal component below a predetermined level of a video signal is varied such that a dark peak level is made to coincide with a pedestal level by feed-back control. According to this configuration, a signal component toward a white level side above the predetermined level is not changed by dark restoration, thereby obtaining stable color reproduction. Furthermore, a stable image can be obtained regardless of abrupt changes in the dark peak level which accompanies fluttering of the entire image.

BRIEF DESCRIPTION OF THE DRAWINGS

FIGS. 9A to 9D are detailed circuit diagrams of the circuit shown in FIG. 5;

FIG. 10A, B, C and FIG. 12A, B are waveform charts of the video signal for explaining the operation of the circuit shown in FIGS. 9A–9D.

DETAILED DESCRIPTION OF THE INVENTION

An embodiment according to the present invention will be described with reference to the accompanying drawings.

Figure 1:
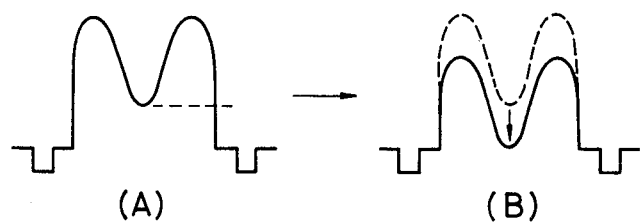
FIG. 1A and B, and FIG. 2A, B, C are waveform charts of a video signal respectively showing signal processing by conventional luminance control.
Figure 2:
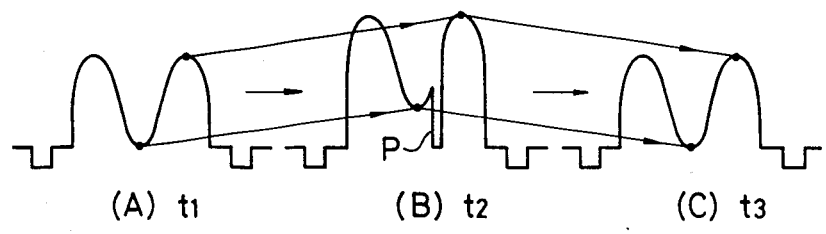
Figure 3:
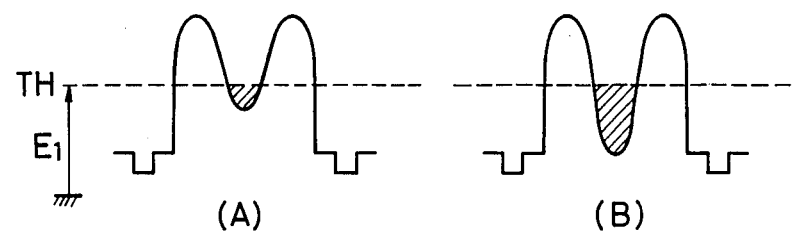
FIG. 3A and B, and FIG. 4A, B, C are waveform charts of a video signal showing processes of dark restoration according to the invention corresponding to FIGS. 1 and 2.
Figure 4:
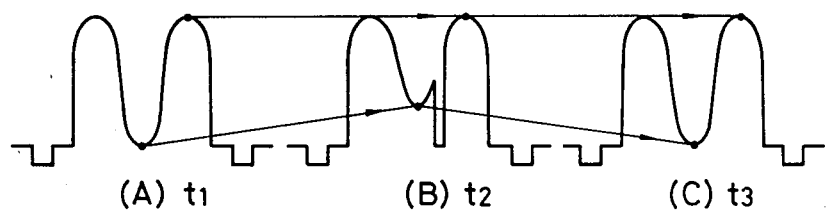

FIG. 3A, B and FIG. 4A, B, C are waveform charts of a video signal for explaining the principal operation of dark restoration according to the present invention and correspond to FIGS. 1A, B and FIGS. 2B, C showing waveforms of the prior art. In the dark level restoration of the present invention, a predetermined threshold level TH is provided at a dark side of a video signal with reference to a pedestal level, as shown in subfigure 3A. Then, a dark signal component which is below the level TH (i.e., dark level side) is extracted and the level thereof is controlled such that a dark peak level coincides with the pedestal level, as shown in subfigure 3B. Accordingly, in the dark level restoration, an amplitude of the video signal component above the level TH (i.e., white level side) is not processed. Therefore, a level ratio of luminance/chroma of a relatively high luminance signal component (e.g., representing a flesh tone) is not subjected to the dark level restoration, thereby providing stable color restoration.

As shown in FIG. 4A, B, C since level control for the dark level restoration is performed near the dark peak level in accordance with the abrupt changes in the dark peak level (t1 to t3), the brightness of an entire image is not subjected to abrupt changes due to the dark peak level change. Therefore, a stable image having a constant brightness can be obtained on a CRT screen.

Figure 5:
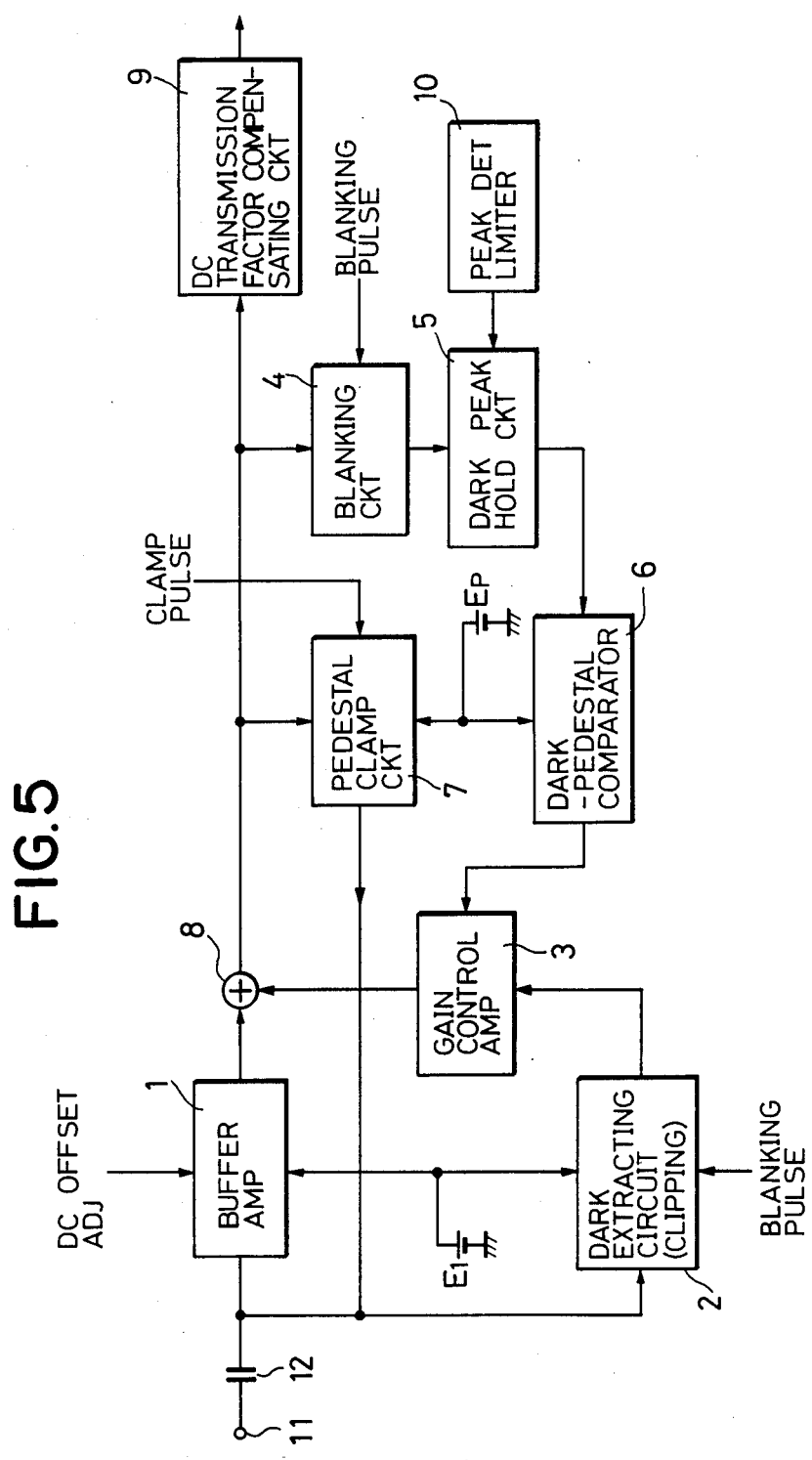
FIG. 5 is a block diagram of a video signal processing circuit according to a dark restoring system of the present invention.

FIG. 5 shows a block diagram of a video signal processing circuit of a TV receiver performing the dark level restoring method described above. A video signal obtained from a video detector (not shown) is supplied to an input terminal 11 of FIG. 5. The video signal is then supplied to a buffer amplifier 1 of unit gain through a clamp capacitor 12. The output signal from the buffer amplifier 1 is supplied to a luminance-chroma processing circuit (not shown) through an adder 8 and a DC transmission factor compensating circuit 9.

The output signal from the adder 8 is also supplied to a pedestal clamp circuit 7 so as to be compared with a reference voltage or clamp potential Ep during a clamp pulse corresponding to a pedestal portion. When a difference between the pedestal level and the reference voltage Ep is detected, this difference or error is fed back to the input terminal of the buffer amplifier 1. This changes a DC charge value of the clamp capacitor 12. Therefore, in the stable state where the error feedback converges, the pedestal level of the output signal of the adder 8 is clamped to the reference voltage Ep.

The input signal to the buffer amplifier 1 is also supplied to a dark extracting circuit 2. A dark signal below the predetermined threshold level TH is extracted, as shown in subfigure 3A. The dark extracting circuit 2 is a kind of clip circuit, and a reference voltage $E_1$ is provided as a clip level. The buffer amplifier 1 is configurated by a differential amplifier, and a DC balance thereof is changed by an external offset adjusting signal, whereby the pedestal level of an input video signal can be offset to the level of $E_1$-TH. Therefore, in the dark extracting circuit 2, the pedestal-clamped video signal which is clamped at the level of $E_1$-TH is clipped by the clip level $E_1$. Thus, a dark signal indicated by the hatched portion of subfigure 3A is extracted. Then, a blanking pulse is supplied to the dark extracting circuit 2 so that the extracted dark signal does not include a synchronizing pulse component.

An amplitude of the extracted dark signal is controlled by a gain control amplifier 3 and the extracted dark signal is supplied to the adder 8 so as to be added to the output signal from the buffer amplifier 1. A gain of the gain control amplifier 3 is changed within a range of 0 to 1. Variable control of the gain is performed with reference to the extracted peak value of the dark signal at the output of the adder 8. Therefore, an amplitude of the dark signal below the threshold level TH included in the output signal of the adder 8 is expanded to a maximum of twice (1+1) toward the darkest level (pedestal level).

This expansion operation is performed by loop control due to the error feedback, such that the dark peak level of the dark signal coincides with the pedestal level. Accordingly, the output signal of the adder 8 is supplied to a blanking circuit 4 to extract the video signal, except for the synchronizing signal component. Then the video signal is supplied to a dark peak hold circuit 5 to have the dark peak level thereof detected. The detected dark peak level is supplied to a dark-pedestal comparator 6 to obtain the difference between the dark peak level and the pedestal level Ep. The circuit loop operates such that the detected difference signal is supplied to the gain control amplifier 3 as a gain control signal so as to make the dark peak level coincide with the pedestal level. As a result, as shown in subfigure 3B, the dark restoration is performed in the TV receiver in the state where the dark peak level is extended towards the pedestal level.

When the dark peak hold circuit 5 detects a peak of a signal component toward the dark level side such as a tuning noise having a large amplitude generated during the tuning operation, the dark peak hold circuit 5 needs a considerable time to return to the normal dark peak detection. During this time, a whitish image is formed. Therefore, in order to prevent this, a peak detecting limiter 10 is provided to control a maximum detecting level of the dark peak hold circuit 5. The limiter 10 controls the detected peak value so as not to be undesirably lowered below the pedestal level.

Figure 6:
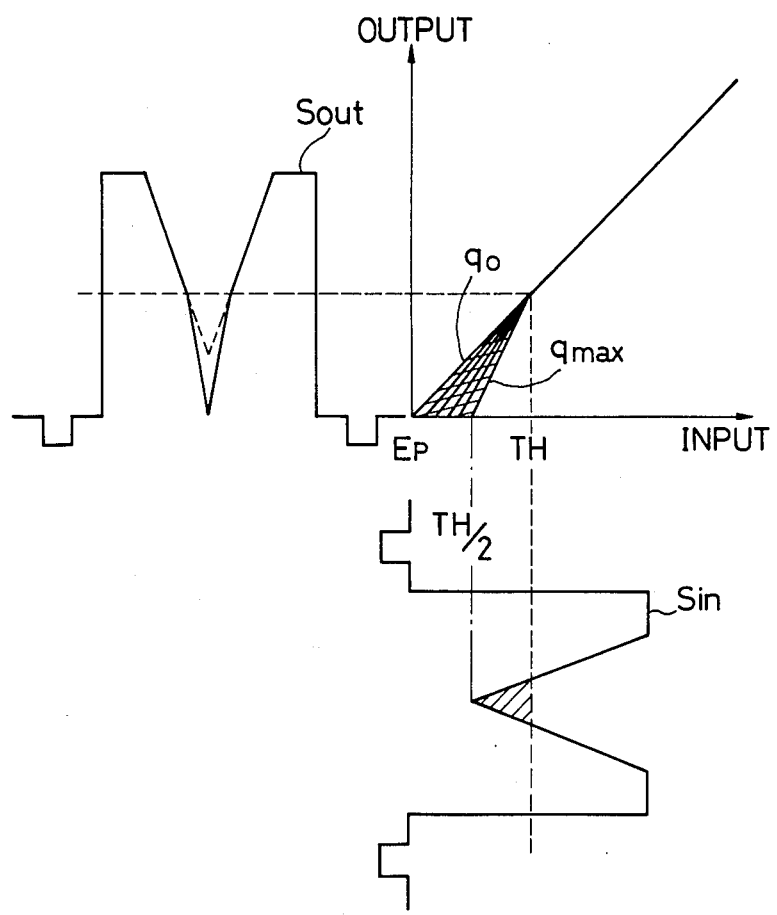
FIG. 6 is a graph showing input/output characteristics of a dark expanding operation of FIG. 5 and an input/output waveform chart thereof.
Figure 7:
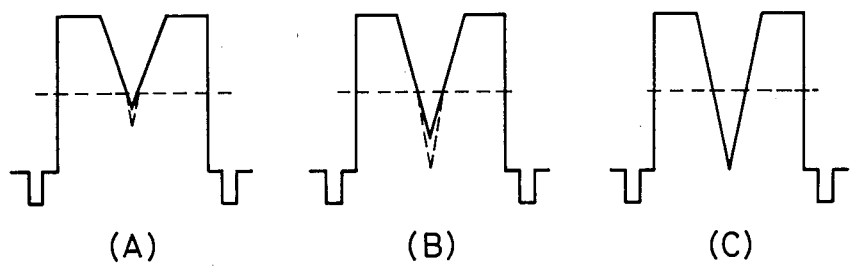
FIGS. 7A to 7C are waveform charts showing various states of dark expansion.

FIG. 6 is a graph showing input/output characteristics of the dark expansion operation of this system and an input/output waveform chart. FIG. 7 shows examples of various video signals to be dark-restored. As shown in FIG. 6, a portion of the input video signal above the threshold level TH is represented by a line of slope 1. Therefore, the operation of the amplitude is not performed for this portion. Namely, in FIG. 5, the output signal of the buffer amplifier 1 is passed through the adder 8 without any change.

Although the dark signal below the threshold level is expanded, the expansion operation is not performed when the dark peak level coincides with the pedestal level as shown in FIG. 7C. As shown in FIG. 6, the input/output characteristics of the video signal below the level TH is represented by a line $q_0$ of slope 1. In this case, a gain of the gain control amplifier 3 is zero.

When the dark peak level is above the pedestal level, the dark expansion is performed corresponding to the shift amount. The maximum expansion ratio or gain is 2. In other words, in FIG. 5, a gain of the gain control amplifier 3 is 1 and the output signal of the buffer amplifier 1 is added to that of the gain control amplifier 3 by the adder 8. Therefore, an amplitude of the dark signal becomes double at most. In this state, the input/output characteristics for the signal below the level TH are represented by a line $q_{max}$ of slope 2 shown in FIG. 6.

If the dark peak level is at the level of TH/2 as an input Sin of FIG. 6, an output signal Sout coincides with the pedestal level by the expansion of a gain of 2. As shown in subfigure 7A, in the case when the input signal has a dark peak level which does not reach the level of TH/2, although a doubling of the dark level expansion at a gain of 2 is performed, the dark peak level does not reach the pedestal level. Therefore, the dark level expansion is controlled so as not to perform the expansion at a gain exceeding 2.

As shown in subfigure 7B, in the case when the input signal has a dark peak level which is below the level of TH/2, the dark level expansion is performed within the gain range of 1 to 2. In this case, one of the lines within the range between the line $q_0$ and the line $q_{max}$ represents the input/output characteristics thereof. A slope of the line is determined by the difference between the dark peak level and the pedestal level. In this case, the gain control amplifier 3 is controlled by the output signal of the dark-pedestal comparator 6 so as to represent its gain within the range of 0 to 1.

In this manner, the maximum value of the expansion gain is controlled to be 2 or less, so that unnatural images caused by nonlinear input/output characteristics of the dark level expansion can be prevented. However, the maximum value of the expansion gain can be set at 2 or more, or 2 or less. When the maximum value of the expansion gain is set at 2 or more, the dark restoration is effectively performed, but the nonlinear characteristics become stronger. Alternatively, when the maximum value is set at 2 or less, the dark restoration is less effective, but the nonlinear characteristics can be moderated.

Figure 8:
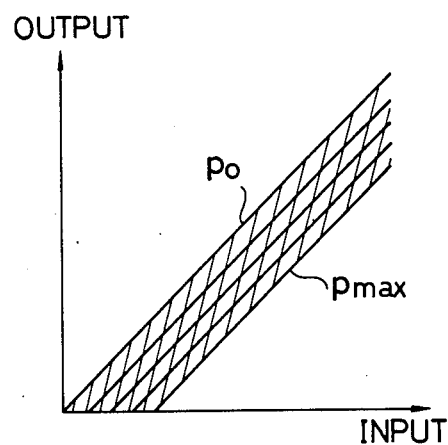
FIG. 8 is a graph showing input/output characteristics of signal processing according to a conventional dark level restoring method.

FIG. 8 shows conventional input/output characteristics of dark restoration. In this case, the signal level (entire luminance level) is decreased corresponding to the shift amount of the dark peak level from the pedestal level as described above. The input/output characteristics are changed within the range indicated by lines $p_0$ to $p_{max}$. Since the line $p_0$ represents a state where the dark peak level coincides with the pedestal level, the dark peak level is not corrected. The line $p_{max}$ represents the state where the maximum level correction is performed. When the dark peak level is abruptly changed, an energy change (light amount change) corresponding to the hatched portion indicated by the lines $p_0$ to $p_{max}$ of the FIG. 8 of an image occurs. On the other hand, the energy change corresponding to that of FIG. 6 occurs within the range indicated by the hatched portion thereof. As is apparent from FIG. 6, the dark restoration can be performed without causing noticeable energy change.

FIGS. 9A to 9D are detailed circuit diagrams of a video signal processing circuit of FIG. 5. Portions divided by the dotted lines in FIGS. 9A to 9D correspond to the blocks of FIG. 5. The processing circuit of FIGS. 9A to 9D is an integrated circuit (IC) formed on a single silicon chip and is provided with pin terminals indicated by hatching. Terminals T1 and T3 are respectively connected to a power supply Vcc and a ground potential.

A video signal is supplied to the buffer amplifier 1 from the terminal T2 through the clamp capacitor 12. The buffer amplifier 1 has a pair of input transistors Q06 and Q07 whose emitters are connected to each other through a resistor R08. The incoming video signal is supplied to a base of the transistor Q06 through an emitter follower transistor Q01. The reference voltage $E_1$ (sub-figure 3A) is supplied to the base of the other transistor Q07 through a wire 16 from a bias circuit 15.

Constant current transistors Q03 and Q04 are respectively connected to the emitters of the pair of transistors Q06 and the Q07 and currents $I_1$ and $I_2$ respectively flow therethrough. Therefore, a current corresponding to the change in the collector current of the transistor Q06 in accordance with the input video signal is transmitted to the emitter of the transistor Q07 so as to make a corresponding change in the collector current thereof. The collector current of the transistor Q07 flows through a load resistor R09, and a signal voltage is extracted from the collector of the transistor Q07. In this case, an amplification gain at this stage is about 1.

The signal from the collector of the transistor Q07 is supplied through emitter follower transistors Q09 and Q12 to the base of one transistor Q13 of a pair of transistors Q13 and Q14 which form a comparator 17 of the clamp circuit 7.

A clamp potential Ep shown in sub-figure 10A is supplied through emitter follower transistors Q18 and Q15 to the other transistor Q14 of the comparator 17. The potential Ep is a constant voltage with reference to the reference voltage $E_1$ (sub-figure 10B) which is supplied from the bias circuit 15 through the wire 16. The base and emitter of a transistor Q08 are respectively connected to the wire 16 and a constant current transistor Q05 (current $I_3$). The clamp potential Ep=Vcc$-I_3 \times$R10 (R10 is a collector load resistance of the transistor Q08) is applied to the collector of the transistor Q08. The potential Ep is supplied to the emitter follower transistor Q18 through a wire 18.

The comparator 17 of the clamp circuit 7 is turned on by a clamp pulse of current Ip generated at each pedestal portion and supplied from a pulse generator 19 through a wire 20. Thereafter, the clamp potential Ep is compared with a pedestal level $e_p$ of a video signal from the collector of the transistor Q07. In this level comparison, the respective base and emitter voltages of the transistors Q09, Q12, Q18 and Q15 are cancelled due to their symmetrical arrangement. The differential voltage of the comparison result is converted into a current by an active load of a current mirror circuit consisting of transistors Q19, Q20 and Q21. Then, this converted current is supplied to the clamp capacitor 12 at the input side of the buffer amplifier 1 through a wire 21.

If $e_p<$Ep, the transistor Q13 of the comparator 17 is turned on and the transistor Q14 thereof is turned off. Therefore, the collector current of the transistor Q13 charges the capacitor 12. As a result, a DC component (pedestal level) of the base input of the transistor Q01 is increased. Alternatively, if $e_p<$Ep, the transistor Q13 is turned off and the transistor Q14 is turned on. The discharged current from the capacitor 12 flows into the transistor Q19 through the wire 21.

In this manner, the pedestal level $e_p$ of the video signal is corrected by feed back of the detected error until the pedestal level $e_p$ of the video signal coincides with the clamp potential Ep. When no error is detected by the comparator 17, the video signal which is pedestal-clamped to the clamp potential Ep can be obtained at the output (the collector of the transistor Q07) of the buffer amplifier 1.

The collector of the transistor Q07 is the adder 8 in FIG. 5. An adding signal for the dark expansion from the gain control amplifier 3 is supplied to the adder 8. The dark-expanded signal is supplied to the peak hold circuit 5 in FIG. 9C through the emitter follower transistors Q09 and Q12 by a wire 23.

The output signal of the emitter follower transistor Q01 at the input side of the buffer amplifier 1 is supplied to the dark extracting circuit 2 in FIG. 9B through a wire 24. The buffer amplifier 1 has a function which can offset the pedestal level of the video signal by the threshold level TH from the reference voltage $E_1$, as shown in sub-figure 10C.

The current values $I_1$ and $I_2$ of the current source transistors Q03 and Q04 connected to the respective emitters of the pair of transistors Q06 and Q07 of the buffer amplifier 1 are set equal to the current value $I_3$ of a current source transistor Q05 connected to the emitter of the transistor Q08 which generates the clamp potential Ep (i.e. $I_1=I_2=I_3$). In other words, emitter resistors R05, R06 and R07 are set to have the same resistance, and the bases of the transistors Q03 to Q05 are commonly connected to have the same current as in transistor Q02 for biasing.

The respective collectors of one transistor Q07 of the buffer amplifier 1 and the transistor Q08 for setting the potential Ep are set at the same potential by the feedback clamp operation in the pedestal interval of the video signal ($e_p = E_p$). The respective collector resistors R09 and R10 of the transistors Q07 and Q08 are set to have the same resistance and the reference voltage $E_1$ is commonly applied to the respective bases of the transistors Q07 and Q08. Then, in the pedestal interval, the transistors Q07 and Q08 are operated under the same condition (i.e., a DC operating point). Therefore, the collector current of the transistor Q07 is equal to the emitter current thereof (i.e., $I_2 = I_3$), and no current flows in an emitter coupling resistor R08 of the transistors Q07 and Q07. For this reason, the base potential of the transistor Q07 in the pedestal interval becomes the same as that of the transistor Q07 and equals the reference voltage $E_1$. Accordingly, the video signal at the base of the transistor Q06 is clamped to the reference voltage $E_1$, as shown in sub-figure 10B.

When an offset current $\alpha$ is supplied to the emitter of the transistor Q07 through a wire 25, this current $\alpha$ flows to the current source of the emitter of the transistor Q06 through the emitter coupling resistor R08. Since the emitter current of the transistor Q06 is the constant value $I_1$, the collector current thereof is decreased by $\alpha$. When the offset current $\alpha$ flows, a potential difference of $R08 \times \alpha$ is generated between the emitters of the transistors Q07 and Q06. If the potential difference $R08 \times \alpha$ is set as the threshold level TH described above, the pedestal level of the video signal at the base of the transistor Q06 is offset at the level of $E_1 - TH$, as shown in sub-figure 10C.

Figure 9C:
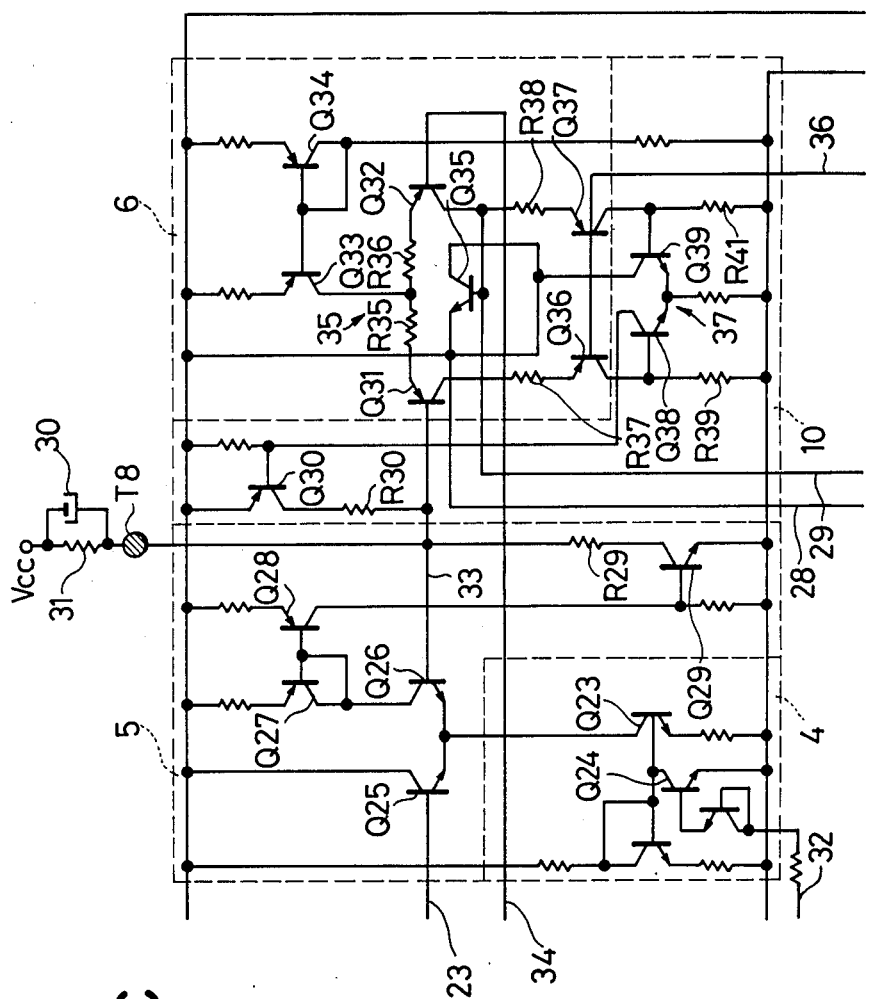
Figure 9D:
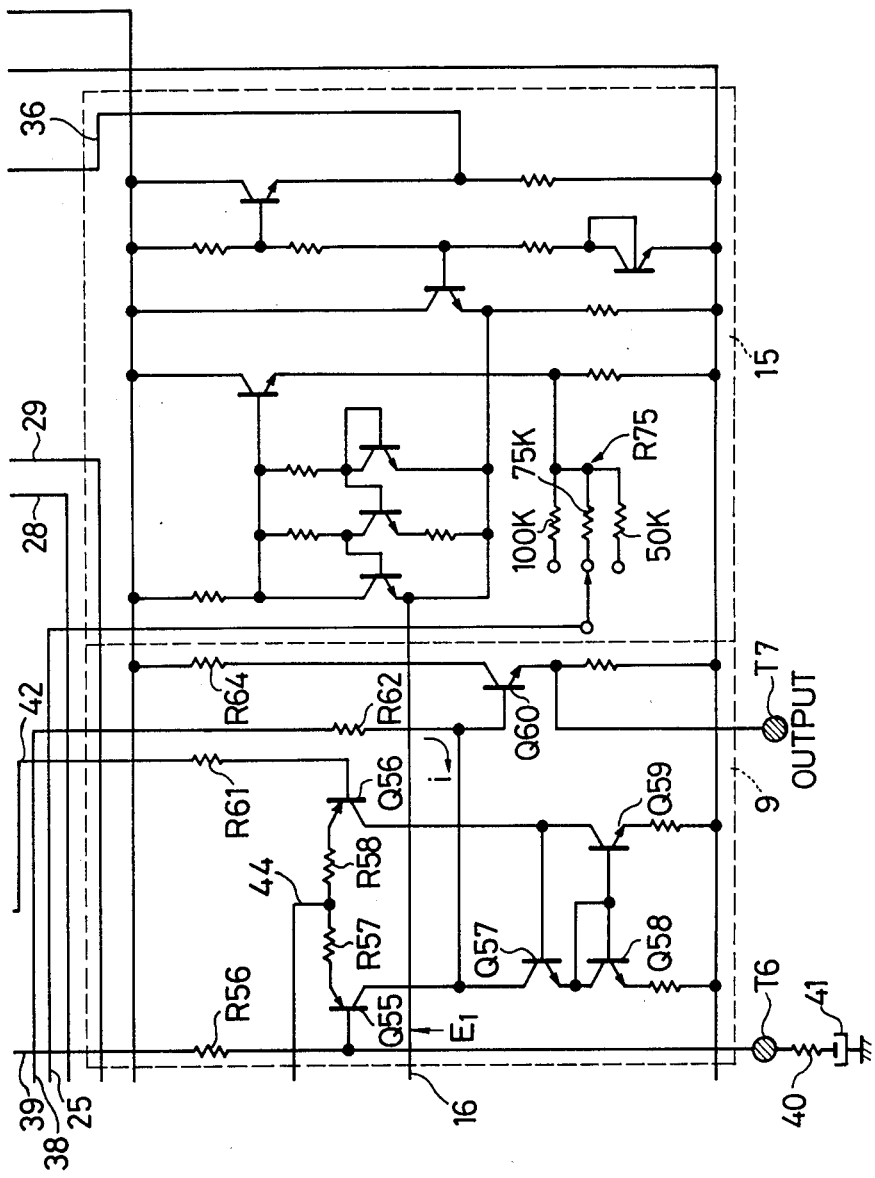

The offset current $\alpha$ in the resistor R08 can be adjusted by changing a resistance of a resistor R75 in the bias circuit 15 in FIG. 9D, thus changing the threshold level TH of the dark extraction in the dark extracting circuit 2 of FIG. 5 and FIG. 9B.

The video signal pedestal-clamped at the level of $E_1 - TH$ as shown in FIG. 10C is obtained as the output signal of the emitter follower transistor Q01 of the buffer amplifier 1 (the base of the transistor Q06). The video signal is supplied through the wire 24 to one (Q45) of the bases of the pair of transistors Q45 and Q46 of the dark extracting circuit 2 in FIG. 9B. These transistors Q45 and Q46 form a clipper 27. The reference voltage $E_1$ is supplied as a clip level to the base of the other transistor Q46 through the wire 16 from the bias circuit 15. The respective emitters of the transistors Q45 and Q46 are coupled to each other through diodes Q43 and Q44 and a resistor R46. The emitter (cathode) of the diode Q43 is coupled to a current source transistor Q41 and a constant current $I_4$ is supplied thereto.

When a signal voltage $e_v$ at the base of the transistor Q45 is larger than the reference voltage $E_1$ ($e_v \geq E_1$), no current flows in the resistor R46 and the transistor Q46 is turned off. On the other hand, when $e_v$ is smaller than $E_1$ ($e_v < E_1$), that is when the signal is extended toward the dark side from $E_1$ as indicated by the hatched portion of FIG. 10C, the transistor Q46 is turned on. Since the signal voltage $e_v$ is obtained from the emitter of the transistor Q45, a signal current of $e_v/R46$ corresponding to the dark signal indicated by the hatched portion of sub-figure 10C flows in the resistor R46 and a dark signal current $i_B$ having substantially the same value as the current $e_v/R46$ flows in the collector of the transistor Q46.

The dark signal current $i_B$ flows out of the adder 8 of the buffer amplifier 1 through the gain control amplifier 3 and a wire 22, whereby the dark signal is added to the output signal of the buffer amplifier 1 in the resistor R09. By this adding, the dark expansion is performed with a gain of about 2 at the maximum.

The gain control amplifier 3 comprises a differential amplifier consisting of a pair of transistors Q47 and Q48. The dark signal current $i_B$ flowing from the common emitter of the pair of transistors Q47 and Q48 is divided at a ratio controlled by the transistors Q47 and Q48. The dividing ratio corresponds to a variable gain of the gain control amplifier 3. A gain control signal is supplied from the dark-pedestal comparator 6 in FIG. 9C through wires 28 and 29.

Figure 11:
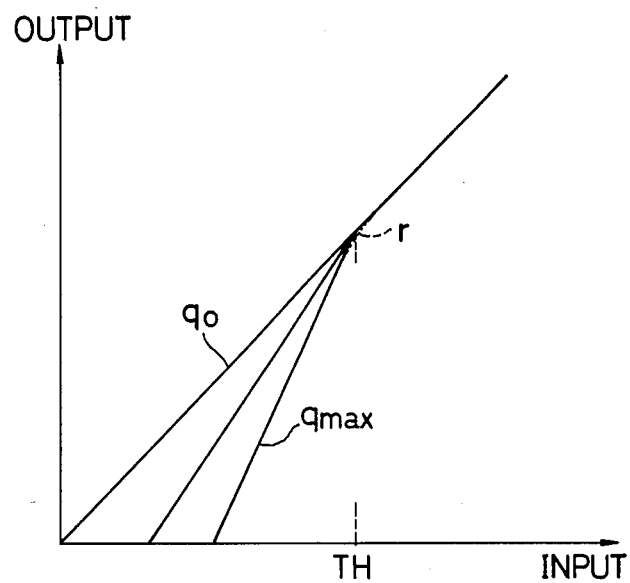
FIG. 11 is an enlarged graph of the input/output characteristics of FIG. 6.

In the state controlled to have the maximum gain, the transistor Q48 of the gain control amplifier 3 is substantially turned on. Then, substantially all of the dark signal current $i_B$ flows from the load resistor R09 of the buffer amplifier 1 through the transistor Q48, the wire 22 and the adder 8. Therefore, in this state, a voltage gain of the added dark signal at one end of the resistor R09 is given by R09/R46 (i.e., R09/R46 is substantially 1). On the other hand, the signal current flows only through the emitter coupling resistor R08 and the load resistor R09, so that the gain of the buffer amplifier 1 is given by R09/R08 (i.e., R09/R08 is also substantially 1). Therefore, the voltage gain of the superimposed signal in the resistor R09 is given by (R09/R46)+(R09/R08) and provided at one end of the load resistor R09 (corresponding to the collector of the transistor Q07). As indicated by the line $q_{max}$ of FIG. 11 (an enlarged view of FIG. 6), the dark expansion is performed at a gain of substantially 2.

When the gain control amplifier 3 is controlled to have the minimum gain, the transistor Q47 is turned on and the transistor Q48 is turned off. For this reason, the dark signal current $i_B$ flows into the transistor Q47. A gain of the dark signal which is supplied to the adder 8 becomes zero. Therefore, no dark expansion is performed, as indicated by the line $q_0$ in FIG. 11.

The clipper 27 is disabled during the synchronizing signal interval, so the synchronizing signal interval which is extended below the pedestal level is not detected as the dark signal. When a blanking pulse BLK is supplied to a control transistor Q42 from a terminal T4, a transistor Q42 is turned on during the synchronizing signal interval, the current source transistor Q41 is turned off, and the pair of transistors Q43 and Q44 which form the clipper 27 are respectively turned off to stop the dark extracting operation.

The respective emitters of the transistors Q45 and Q46 are coupled to each other through the diodes Q43 and Q44 and a resistor R46. Needless to say, the diodes Q43 and Q44 are not turned on/off to have steep leading and trailing edges, and have a transient region according to an exponential function. Therefore, no abrupt clipping occurs above the threshold level TH, and soft-clipping is performed during the interval having a predetermined range near the threshold level TH. As a result, the folded point of the nonlinear characteristics of the dark expansion is omitted and moderately curved nonlinear characteristics can be obtained, as indicated by the dotted line r of FIG. 11. Therefore, degradation of an image due to nonlinear processing of the amplitude of the video signal can be considerably reduced.

The dark expanded video signal is supplied to the dark peak hold circuit 5 in FIG. 9C through the emitter follower transistors Q09 and Q12 and a wire 23 from the collector of the transistor Q07 of the buffer amplifier 1 having the adder 8 in the state wherein the video signal is pedestal-clamped at the potential Ep. The peak hold circuit 5 has a pair of emitter coupled transistors Q25 and Q26. The dark expanded video signal as indicated by the dotted line of sub-figure 10A is supplied to the base of one transistor Q25. On the other hand, a peak hold capacitor 30 is connected between a terminal T8 coupled to the base of the other transistor Q26 and a power supply Vcc, and a hold voltage corresponding to the dark peak value is generated at the base of the transistor Q26 as a charge voltage of the capacitor 30.

When the peak level lowers toward the dark level side, the charge amount of the capacitor 30 is increased and the base potential of the transistor Q26 becomes closer to the ground side. Since the dark peak value of the video signal changes in correspondence with the content of the image, a discharging resistor 31 is coupled between the terminal T8 and the power supply Vcc in parallel with the capacitor 30 so as to follow the dark peak value over time. The discharging constant (recovery time) is set at several seconds.

When the dark peak level of the video signal at the base of the transistor Q25 is lower than the peak hold value at the base of the transistor Q26, the transistor Q25 is turned off and the transistor Q26 is turned on. Then, a current flows to turn on a transistor Q29 through a current mirror circuit consisting of transistors Q27 and Q28 both coupled to the collector of the transistor Q26. When the transistor Q29 is turned on, the capacitor 30 is charged through a resistor R29 having a small resistance until the dark peak value occurs. A charging time constant (attack time) determined by the capacitor 30 and the resistor R29 is set at a sufficiently small value. When the input video signal level exceeds the detected dark peak hold value, the transistor Q25 is turned on and the transistor Q26 is turned off, thus achieving the peak hold state.

The blanking circuit 4 is operated during the synchronizing signal interval so the dark peak hold circuit 5 may not erroneously detect a tip level of the synchronizing signal as the dark peak level. In this case, the blanking pulse BLK is supplied to a control transistor Q24 from the terminal T4 through a wire 32. Then, during the synchronizing signal interval, the transistor Q24 is turned on and a transistor Q23 is turned off. The transistor Q23 serves as the current source of the pair of transistors Q25 and Q26 of the dark peak hold circuit 5. Therefore, these transistors Q25 and Q26 are both turned off to stop the dark peak holding operation.

The output signal of the dark peak hold circuit 5 is supplied to the dark-pedestal comparator 6 through a wire 33. The comparator 6 has a differential amplifier 35 having transistors Q31 and Q32. The respective emitters of the transistors Q31 and Q32 are coupled to each other through resistors R35 and R36, and a constant current is supplied to the coupled point therebetween from a current mirror circuit consisting of transistors Q33 and Q34. The dark peak hold level is applied to the base of the transistor Q31 of the differential amplifier 35. On the other hand, the clamp potential Ep is applied to the base of the other transistor Q32 thereof through the emitter follower transistors Q18 and Q15 and a wire 34. It therefore compares the dark peak hold value with the clamp potential Ep.

When the dark peak hold value is higher than the potential Ep toward the white level side, the collector output voltage of the transistor Q32 of the differential amplifier 35 becomes high. This output voltage is supplied to the base of the transistor Q48 of the gain control amplifier 3 through a wire 29, and thus decreases the impedance of the transistor Q48. A voltage having a lower voltage than that of the wire 29 by a base-emitter voltage of $V_{BE}$ is supplied through the wire 28 to the base of the transistor Q47 of the gain control amplifier 3 from the emitter of the transistor Q35, thus turning off the transistor Q47.

As a result, the dark signal current $i_B$ from the adder 8 of the buffer amplifier 1 is increased corresponding to the difference between the dark peak and pedestal levels. Then, the dark signal of the video signal obtained as the output of the adder 8 is expanded. This dark expansion is performed until the dark peak level coincides with the reference voltage, i.e., pedestal level $e_p$. When the dark peak level reaches the pedestal level $e_p$ the differential amplifier 35 is substantially balanced to stop the dark expansion operation. In this state, the current ratio of the collectors of the transistors Q47 and Q48 of the gain control amplifier 3 is determined by the small potential difference between the bases thereof. Corresponding to this current ratio, the dark signal current $i_B$ is divided and the dark signal is superimposed at a given current ratio.

The collectors of the transistors Q31 and Q32 which constitute the differential amplifier 35 are respectively coupled to the emitters of transistors Q36 and Q37 through resistors R37 and R38. A voltage supplied from the bias circuit 15 of FIG. 9D through a wire 36 is kept constant at the respective bases of the transistors Q36 and Q37. Therefore, when the differential amplifier 35 is balanced, substantially the same current flows through the respective collectors of the transistors Q31 and Q32. This current flows through the collectors of the transistors Q36 and Q37 to resistors R39 and R41, respectively. These resistors R39 and R41 are coupled to the bases of a pair of transistors Q38 and Q39 which constitute a detector 37 of the peak detecting limiter 10. Resistances of the resistors R39 and R41 are set so that R39<R41. When the differential amplifier 35 is balanced, the base voltage of the transistor Q39 becomes high and that of the transistor Q38 becomes low. Therefore, the transistor Q39 is turned on and the transistor Q38 is turned off.

When tuning a TV receiver, a noise component having a large amplitude is sometimes applied to the terminal T1. The peak level of this noise component becomes abnormally lower than the pedestal level. In this case, the peak detecting limiter 10 is operated so as not to erroneously detect the peak level of the noise component as that of the dark signal.

When the dark peak hold value which is supplied to the base of the transistor Q31 of the differential amplifier 35 becomes abnormally lower than the pedestal level (i.e., when it is below the level of Ep−ΔE), the collector current of the transistor Q31 is increased and the base voltage of the transistor Q38 of the detector 37 is increased, so that the transistor Q38 is turned on and the transistor Q39 is turned off. As a result, a transistor Q30 is turned on. Then a constant current flows through resistors R30 and R29 and transistor Q29, thus increasing the dark peak hold value generated in wire 33. In other words, the dark peak hold value is controlled not to become lower than the level of $E_p - \Delta E$. A limit level can be set at the level ($E_p - \Delta E$) which is decreased down to the sync tip level so it is lower than the pedestal level $E_p$. The value of the $\Delta E$ can be set in accordance with the resistance ratio between the resistors R39 and R41, and the gain of the differential amplifier 35.

In this manner, the dark expanded video signal is obtained via a terminal T7 of FIG. 9D through the emitter follower transistors Q09 and Q10, a wire 38 and an output transistor Q60 of the DC transmission factor compensating circuit 9 from the adder 8 (the collector of the transistor Q07) of the buffer amplifier 1. The pedestal-clamped video signal (sub-figure 12A) having the pedestal level of $e_p$ at the adder 8 of the buffer amplifier 1 and the clamp potential Ep are respectively supplied to the bases of a pair of transistors Q11 and Q16 which are provided in the clamp circuit 7. The emitters of these transistors Q11 and Q16 are commonly coupled to each other, and are grounded through a resistor R13. Therefore, a video signal which exceeds the pedestal level Ep is extracted. The transistors Q11 and Q16 are operated as the clipper (or NAM circuit) 27 which removes the synchronizing signal component as indicated by the dotted line of sub-figure 12A.

The clipped video signal is supplied through a wire 39 at terminal T6 to an average picture level (APL) detecting circuit formed of a resistor 40 and capacitor 41 which are series-connected to a resistor R56 of the DC transmission factor compensating circuit 9 of FIG. 9D. In this APL detecting circuit, the signal can be smoothed by the time constant which is determined by the resistor R56, R40 and the capacitor 41, thus detecting an average value of the signal. The detected average value is voltage-divided into proper value by the resistors R56 and R40. Then, the voltage-divided value is supplied to the base of a transistor Q55 of a pair of transistors Q55 and Q56. The clamp potential Ep is supplied to the base of the other transistor Q56 through the emitter follower transistor Q18 and an emitter follower transistor Q17, a wire 42, and a resistor R61. The emitters of the transistors Q55 and Q56 are commonly coupled to each other through resistors R57 and R58. A pulse current corresponding to the pedestal interval is supplied to the coupled point between the transistors Q55 and Q56 through the wire 44.

Figure 12:
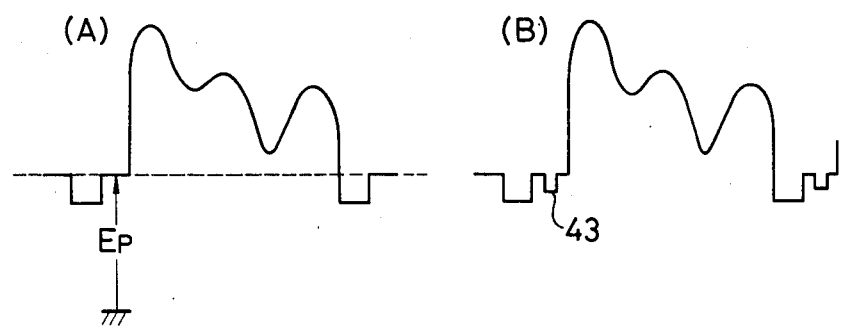

Accordingly, the transistors Q55 and Q56 are operated only during the pedestal interval. During this interval in which the APL detected level is higher than the potential Ep, a current i corresponding to the difference therebetween flows through a resistor R62 and an active load formed of a transistor Q57, and current mirror transistors Q58 and Q59. As a result, during the pedestal interval, a DC transmission factor compensating pulse 43 is superimposed on the video signal component which is derived from the terminal T7, as shown in FIG. 12B. The level of this compensating pulse 43 is in proportion to the difference between the APL detected level and the reference level, thus compensating for the decrease in pedestal level in correspondence with the low level portion of the APL. When the DC transmission factor of the later stage is less than 100%, reverse compensation is performed such that the DC transmission factor is compensated to be 100% at the cathode of the CRT. Therefore, stable dark restoration can be obtained.

In the pulse generator 19 of FIG. 9B, transistors Q53 and Q54 are turned on by the blanking pulse BLK and the clamp pulse of the pedestal interval which are applied from the terminal T4 and a terminal T5. Current source transistors Q49 and Q50 are turned on during the pedestal interval of the blanking interval. Then the clamp pulse is supplied to the clamp circuit 7 of FIG. 9A and the DC transmission factor compensating circuit 9 of FIG. 9D through transistors Q51 and Q52.

According to the present invention, as described above, a dark signal whose level is lower than a predetermined level is extracted. The extracted dark signal is expanded so as to make the peak level coincide with a pedestal level. As a result, a luminance level of a signal component which is at the white level side of the pedestal level is not affected by dark level restoration, thereby providing a stable color reproduction. Fluttering caused by the image going dark and light in response to abrupt changes in the dark peak level does not occur, so that a stable picture is obtained.

Although various minor changes and modifications might be proposed by those skilled in the art, it will be understood that we wish to include within the claims of the patent warranted hereon all such changes and modifications as reasonably come within our contribution to the art.

We claim as our invention:

1. A dark level restoring circuit for use in a television apparatus, comprising:
   extracting means for extracting a dark signal from an incoming video signal exceeding a predetermined dark level;
   adding means connected to said extracting means for adding the extracted dark signal to said incoming video signal;
   peak detecting means connected to said adding means for detecting a dark peak of a video signal obtained from said adding means; and
   adjusting means connected to said adding means and said peak detecting means for adjusting a level of the extracted dark signal to be added to said incoming signal.

2. A dark level restoring circuit according to claim 1 wherein said adjusting means includes comparison means for comparing the dark peak to a reference pedestal level and said adjusting means controlling the level of the extracted dark signal to be added such that the dark peak of the video signal is extended toward the reference pedestal level.

3. A dark level restoring circuit according to claim 2 wherein said adjusting means includes gain controllable amplifying means connected to receive a difference signal from said comparison means for controlling the level of said extracted dark signal in response to said difference signal of said comparison means.

4. A dark level restoring circuit according to claim 3 wherein said peak detecting means includes blanking means for eliminating a detecting operation of the peak detecting means during blanking intervals.

5. A dark level restoring circuit according to claim 4 wherein said peak detecting means includes a peak detecting limiter for protecting erroneous operation of the peak detecting means due to noises.

6. A dark level restoring circuit for use in a television apparatus, comprising:
   extracting means for extracting a dark signal from an incoming video signal which is darker than a reference level;

gain control means connected to said extracting means for varying an amplitude of the extracted dark signal and providing an amplified extracted dark signal;

adding means for adding the amplified extracted dark signal from the gain control means to the incoming video signal; and peak detecting means for detecting a dark peak of a video signal at an output of the adding means, and which is connected to control a gain of said gain control means.

7. A circuit according to claim 6 wherein the peak detecting means includes comparator means for comparing a reference voltage corresponding to a desired reference pedestal level to said detected dark peak of the video signal at the output of the adding means.

* * * * *